(12) United States Patent
Fang et al.

(10) Patent No.: US 11,119,863 B2
(45) Date of Patent: Sep. 14, 2021

(54) DATA BACKUP METHOD AND DATA PROCESSING SYSTEM

(71) Applicant: HUAWEI TECHNOLOGIES CO., LTD., Guangdong (CN)

(72) Inventors: Hao Fang, Shenzhen (CN); Jieshan Bi, Shenzhen (CN); Chaoqiang Zhong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/927,332

(22) Filed: Mar. 21, 2018

(65) Prior Publication Data

US 2018/0210795 A1 Jul. 26, 2018

Related U.S. Application Data

(63) Continuation of application No. PCT/CN2016/085608, filed on Jun. 13, 2016.

(30) Foreign Application Priority Data

Sep. 25, 2015 (CN) .......................... 201510620975.9

(51) Int. Cl.
*G06F 11/00* (2006.01)
*G06F 11/14* (2006.01)
*G06F 16/27* (2019.01)

(52) U.S. Cl.
CPC ...... *G06F 11/1461* (2013.01); *G06F 11/1446* (2013.01); *G06F 11/1451* (2013.01);
(Continued)

(58) Field of Classification Search
CPC ............ G06F 11/1446; G06F 11/1451; G06F 11/1461
See application file for complete search history.

(56) References Cited

U.S. PATENT DOCUMENTS 6,785,786 B1 * 8/2004 Gold .................. G06F 11/1461
711/162
7,234,077 B2 6/2007 Curran et al.
(Continued)

FOREIGN PATENT DOCUMENTS

CN 101064730 A 10/2007
CN 101300553 A 11/2008
(Continued)

OTHER PUBLICATIONS

Wang Li-feng, Study of Large Objects Storage Scheme in HBase Database. Computer Knowledge and Technology, vol. 10, No. 23, Aug. 2014, 7 pages.

*Primary Examiner* — Reginald G Bragdon
*Assistant Examiner* — Michael L Westbrook
(74) *Attorney, Agent, or Firm* — Slater Matsil, LLP

(57) ABSTRACT

A data backup method and a data processing system are provided. The method includes: when a quantity of storage files stored in a storage medium meets a preset threshold, acquiring storage files which are stored in the storage medium after a time point, where the time point is a time of previously backing up storage files in the storage medium; combining the storage files after the time point to obtain at least one new storage file; and backing up the at least one new storage file. Therefore, incremental backup is performed on the storage files after the time point.

11 Claims, 4 Drawing Sheets

(52) U.S. Cl.
CPC .......... *G06F 11/1464* (2013.01); *G06F 16/27* (2019.01); *G06F 2201/835* (2013.01)

(56) References Cited

U.S. PATENT DOCUMENTS

| | | | |
|---|---|---|---|
| 7,809,691 B1 | 10/2010 | Karmarkar et al. | |
| 8,005,797 B1 | 8/2011 | Chepel et al. | |
| 10,078,555 B1 | 9/2018 | Kumar et al. | |
| 2003/0056139 A1 | 3/2003 | Murray et al. | |
| 2005/0131990 A1* | 6/2005 | Jewell | G06F 11/1464 |
| | | | 709/201 |
| 2009/0119350 A1 | 5/2009 | Yamaguchi et al. | |
| 2012/0036106 A1 | 2/2012 | Desai et al. | |
| 2014/0052692 A1 | 2/2014 | Zhang et al. | |
| 2014/0214769 A1 | 7/2014 | Takayama | |
| 2018/0139053 A1 | 5/2018 | Kadam et al. | |

FOREIGN PATENT DOCUMENTS

| | | |
|---|---|---|
| CN | 101394424 A | 3/2009 |
| CN | 101650677 A | 2/2010 |
| CN | 101729671 A | 6/2010 |
| CN | 102541940 A | 7/2012 |
| CN | 102955861 A | 3/2013 |
| CN | 102999400 A | 3/2013 |
| CN | 103049353 A | 4/2013 |
| CN | 103778033 A | 5/2014 |
| CN | 103793493 A | 5/2014 |
| CN | 104081329 A | 10/2014 |
| CN | 104199901 A | 12/2014 |
| CN | 104199963 A | 12/2014 |
| CN | 105005617 A | 10/2015 |
| CN | 105243109 A | 1/2016 |
| CN | 107111534 A | 8/2017 |
| EP | 3287911 A1 | 2/2018 |

* cited by examiner

DATA BACKUP METHOD AND DATA PROCESSING SYSTEM

CROSS-REFERENCE TO RELATED APPLICATIONS

This application is a continuation of International Application No. PCT/CN2016/085608 filed on Jun. 13, 2016, which claims priority to Chinese Patent Application No. 201510620975.9, filed on Sep. 25, 2015. The disclosures of the aforementioned applications are hereby incorporated by reference in their entireties.

TECHNICAL FIELD

The present application relates to the database field, and in particular, to a data backup method and a data processing system.

BACKGROUND

When data is written into a distributed database, the data is stored in one or more sub-tables in a user table. When a specific condition is met, the data is backed up, so as to ensure reliability of the data.

However, currently, a long time is consumed for data backup in the distributed database, and consumption of network and magnetic disk resources is relatively high during backup.

SUMMARY

This application provides a data backup method and a data processing system, so as to determine incremental data for backup by recording a data backup time point, thereby shortening a time of backing up the incremental data, and reducing consumption of network and magnetic disk resources for backing up the incremental data.

According to an aspect, this application provides a data backup method, and the method includes:
 backing up, at a first time point, a first storage file stored in a first storage medium, and recording the first time point; when a quantity of second storage files in the first storage medium reaches a preset threshold, combining the second storage files into at least two third storage files by using the recorded first time point as a demarcation point, where the second storage files include the first storage file and a new storage file generated from the first time point to a current time point; and performing incremental backup on at least one third storage file generated after the first time point.

In a possible design, the performing incremental backup on at least one third storage file generated after the first time point specifically includes: obtaining timestamp ranges of the at least two combined third storage files; determining, according to a timestamp range of each third storage file and by using the first time point as a demarcation point, the third storage file generated after the first time point; and performing incremental backup.

In a possible design, the first storage file is backed up according to a preset rule.

In another possible design, the obtaining timestamp ranges of the at least two third storage files includes obtaining a timestamp range from a metadata block of each third storage file.

In still another possible design, after the performing incremental backup on the at least two third storage files according to the first time point, the method further includes: recording a second time point of the incremental backup operation, so as to combine or back up newly generated storage files according to the second time point.

According to an aspect, this application provides a data processing system, and the system includes:
 a backup module, configured to: back up, at a first time point, a first storage file stored in a first storage medium, and record the first time point of the backup operation; and a combination module, configured to: when a quantity of second storage files in the first storage medium meets a preset threshold, combine the second storage files into at least two third storage files by using the recorded first time point as a demarcation point, where the second storage files include the first storage file and a new storage file generated from the first time point to a current time point, and the backup module is further configured to back up at least one third storage file generated after the first time point.

In a possible design, the data processing system further includes: an obtaining module, configured to obtain timestamp ranges of the at least two combined third storage files; and a determining module, configured to determine, according to a timestamp range of each third storage file and by using the first time point as a demarcation point, the third storage file generated after the first time point, where the backup module performs incremental backup on the third storage file that is determined by the determining module and that is generated after the first time point.

In a possible design, the backup module is specifically configured to back up the first storage file according to a preset condition.

In another possible design, the obtaining module is specifically configured to obtain a timestamp range from a metadata block of each third storage file.

In still another possible design, the backup module is further configured to record a second time point of the incremental backup operation, so as to combine or back up newly generated storage files according to the second time point.

According to an aspect, this application provides a data processing system, and the data processing system includes a processor and a memory. The processor is configured to: back up, according to a preset rule stored in the memory, a first storage file stored in the memory, and record a first time point of the backup operation; when a quantity of second storage files in the memory exceeds a preset threshold, combine the second storage files into at least two third storage files by using the recorded first time point as a demarcation point, where the second storage files include the first storage file and a new storage file generated from the first time point to a current time point; and back up, by using the recorded first time point as a demarcation point, a third storage file generated after the first time point.

In a possible design, the processor obtains timestamp ranges of the at least two combined third storage files; determines, by using the first time point as a demarcation point, the third storage file generated after the first time point; and performs incremental backup.

In another possible design, the processor obtains a timestamp range from a metadata block of each third storage file.

In still another possible design, the processor records a second time point of the incremental backup operation, so as to combine or back up newly generated storage files according to the second time point.

According to the data backup method and the data processing system provided in this application, incremental data for backup is determined by recording a data backup time point, so as to avoid a process in which data in an entire table is read for storage of the incremental data, thereby shortening a time of backing up the incremental data, and reducing consumption of network and magnetic disk resources for backing up the incremental data.

DESCRIPTION OF EMBODIMENTS

Embodiments of the present application are applied to a database in which storage is performed in a storage manner of a key-value (KeyValue) type. That is, data that needs to be stored by a user is stored in a value part, a key corresponding to a value is created, and when the user needs to search for a value, the corresponding value is indexed and searched for by using the key. During storage, data is naturally sorted according to a dictionary sequence of keys.

Figure 1:
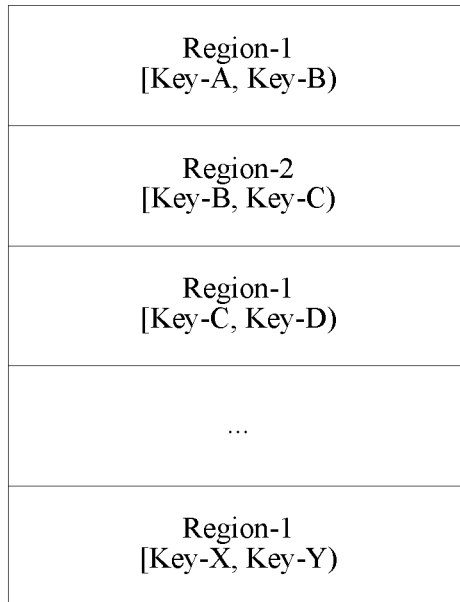
FIG. 1 is a schematic diagram of a sub-table in a user table.

When a user needs to store data in a distributed database, a corresponding user table (Table) is created. A table may store a large amount of data, and for ease of management and maintenance, the table may be divided to generate one or more sub-tables (Region) according to a dictionary sequence of recorded key values. Each region is a set of data in one key interval, or may be a set of data in consecutive rows. A key corresponding to each key-value falls within only one region interval, that is, there is no overlap between multiple regions. As shown in FIG. 1, FIG. 1 is a schematic diagram of a sub-table in a user table. In FIG. 1, Key-A in Region-1 represents an infinitely small value in a dictionary sequence, and Key-Y in Region-M represents an infinitely large value in the dictionary sequence.

When data is written into the distributed database, the data may be written into both a memory of a WAL and a memory of a region. When data in the memory of the region meets a preset memory threshold, the data in the region is permanently written into a magnetic disk, and a storage file Hfile is generated on the magnetic disk. A metadata block of the Hfile file stores a recorded timestamp range of the data in the region.

To avoid impact on performance of reading data from the database, when a quantity of storage files Hfile on the magnetic disk meets a preset quantity threshold, multiple storage files Hfile on the magnetic disk are combined (Compaction) to obtain at least one storage file Hfile.

To prevent a data loss that is caused because of an operation fault or a system fault of a system, all data or a set of some data in the system needs to be copied from a hard disk or an array of an application host to the application host or another secure storage medium.

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application shall fall within the protection scope of the present application.

For ease of description, the technical solutions in the embodiments of the present application are described in detail with reference to FIG. 2. It should be understood that this is merely an example used to describe the technical solutions in the embodiments of the present application, and shall not constitute any limitation on the embodiments of the present application.

Figure 2:
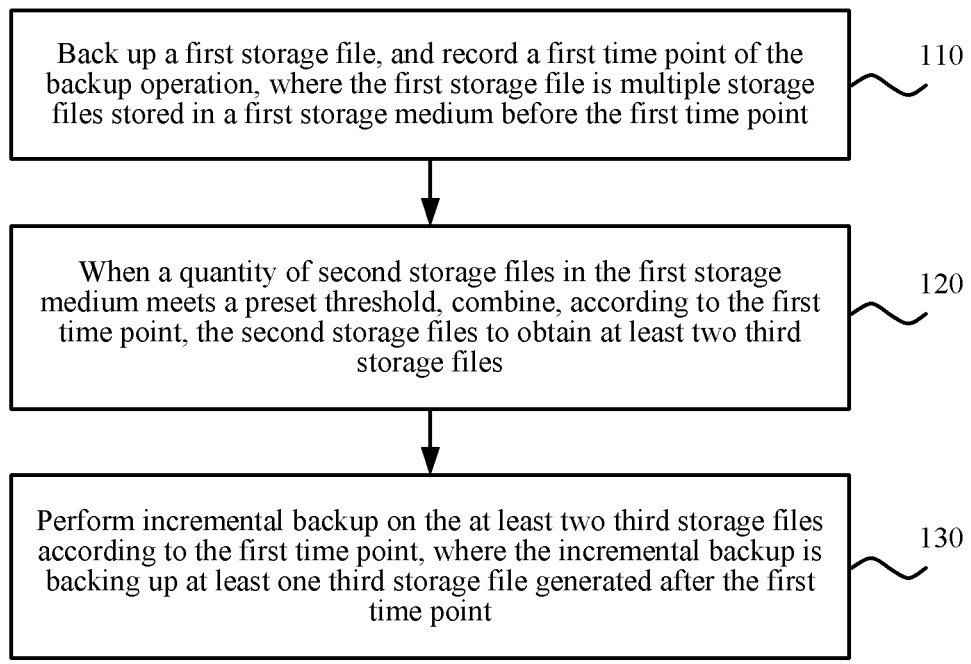
FIG. 2 is a flowchart of a data backup method in a distributed database according to an embodiment of the present application.

FIG. 2 is a flowchart of a data backup method according to an embodiment of the present application. As shown in FIG. 2, the method 100 is performed by a data processing system. The method 100 includes:

110. Back up a first storage file, and record a first time point of the backup operation, where the first storage file is multiple storage files stored in a first storage medium before the first time point.

120. When a quantity of second storage files in the first storage medium meets a preset threshold, combine, according to the first time point, the second storage files to obtain at least two third storage files.

130. Perform incremental backup on the at least two third storage files according to the first time point, where the incremental backup is backing up at least one third storage file generated after the first time point.

Specifically, to ensure security of data in a database, all or some data in the database is backed up. The data processing system may include multiple terminals, and each terminal includes a first storage medium.

In 110, the first storage medium may be specifically a magnetic disk. The first storage file may be all or some of storage files on magnetic disks of one or more terminals. All or some of the storage files on the magnetic disks are backed up at the first time point, and the current file backup time point is recorded.

Optionally, in this embodiment of the present application, the first storage file may be backed up according to a preset rule. The preset rule may be a data backup condition formulated according to a user requirement. For example, a user needs to perform full backup on the first day of each month, and perform incremental backup each day, and the preset rule may be formulated by using a timer or another logical method for meeting a user requirement. Data backup is performed by using a preset rule, so as to facilitate use for a user, and ensure data reliability.

It should be understood that in this embodiment of the present application, backup of the first storage file may be artificially performed.

In 120, the second storage files are storage files stored in the first storage medium at a current time point, and the second storage files include the first storage file that has been backed up and a new storage file generated from the first time point to the current time point. The third storage file is a new storage file generated after combining the second storage files. When a quantity of storage files on the magnetic disk reaches a preset quantity threshold, storage files generated before the first time point and storage files generated after the first time point are separately combined into at least one storage file according to the first time point.

In 130, incremental backup is performed on the storage files generated after the first time point, timestamp ranges of all storage files are read, the storage files generated after the first time point are queried, and incremental backup is performed on data in the storage files according to a query result.

Optionally, in this embodiment of the present application, obtaining timestamp ranges of the at least two combined third storage files may include obtaining a timestamp range from a metadata block of each third storage file.

In this embodiment of the present application, after incremental backup is performed on the at least two third storage files according to the first time point, the method 100 further includes: recording a second time point of the incremental backup operation, so as to combine or back up newly generated storage files according to the second time point.

Specifically, after performing incremental backup on data, the data processing system records a time point of the current incremental backup operation, so that within a time period after the time point, when the quantity of storage files on the magnetic disk reaches the preset threshold, the data processing system combines the storage files according to the recorded time point, and backs up combined incremental data.

According to the data backup method in a distributed database provided in this embodiment of the present application, a file on which incremental backup is to be performed is determined by recording a previous backup time point to perform incremental backup, so as to avoid a process in which data in an entire table is read for backup of incremental data, thereby shortening a time of backing up the incremental data, and reducing consumption of network and magnetic disk resources for backing up the incremental data.

Figure 3:
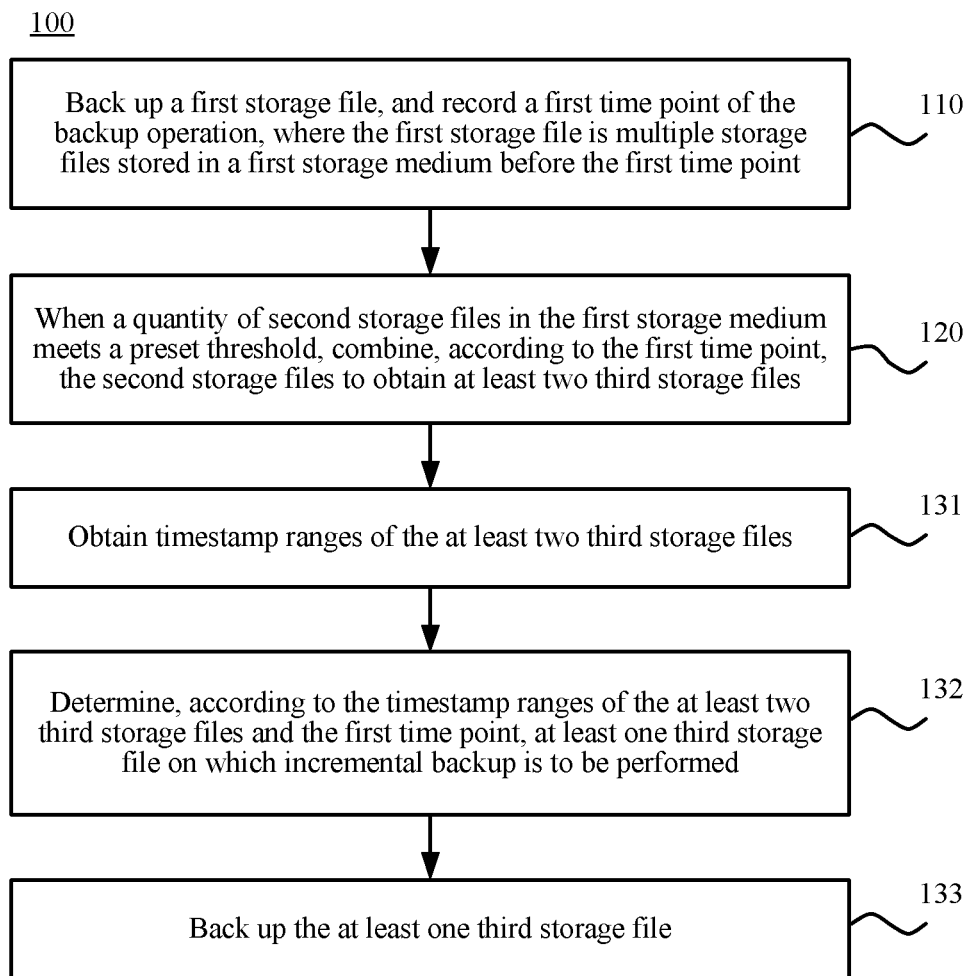
FIG. 3 is a flowchart of another data backup method in a distributed database according to an embodiment of the present application.

Preferably, in another embodiment of the present application, as shown in FIG. 3, the performing incremental backup on the at least two third storage files according to the first time point includes:

131. Obtain timestamp ranges of the at least two third storage files.

132. Determine, according to the timestamp ranges of the at least two third storage files and the first time point, the at least one third storage file on which incremental backup is to be performed.

133. Back up the at least one third storage file.

Specifically, the data processing system reads timestamp ranges of all combined storage files, determines, according to a timestamp range of each storage file, the third storage file whose timestamp range is after the first time point, and backs up the determined third storage file generated after the first time point.

According to the data backup method in a distributed database provided in this embodiment of the present application, a file on which incremental backup is to be performed is determined by recording a previous backup time point to perform incremental backup, so as to avoid a process in which data in an entire table is read for backup of incremental data, thereby shortening a time of backing up the incremental data, and reducing consumption of network and magnetic disk resources for backing up the incremental data.

For ease of description, an example in which the first storage medium is a magnetic disk, and a combination operation procedure is performed when there are five storage files on the magnetic disk is used to describe the technical solutions in the embodiments of the present application in detail. It should be understood that this is merely an example used to describe the technical solutions in the embodiments of the present application, and shall not constitute any limitation on the embodiments of the present application.

Three storage files Hfile 1, Hfile 2, and Hfile 3 that are stored on the magnetic disk before a time point T1 are backed up, and a terminal records the time point T1 of the backup operation. Within a time period from the time point T1 to a time point T2, two storage files Hfile 4 and Hfile 5 are newly generated on the magnetic disk. In this case, storage files on the magnetic disk meet the preset quantity threshold, and according to the recorded time point T1, the three storage files Hfile 1, Hfile 2, and Hfile 3 before the time point T1 are combined into a storage file Hfile 6, and the two storage files after the time point T1 are combined into a storage file Hfile 7. At a time point T3, the terminal reads timestamp ranges of the two combined storage files Hfile 6 and Hfile 7, determines the storage file Hfile 7 generated after the time point T1, and backs up the determined storage file Hfile 7. Data in the storage file is incremental data generated after the time point T1, and the backup process is referred to as incremental backup.

It should be understood that in this embodiment of the present application, the time point T1, the time point T2, and the time point T3 are three time points arranged according to a time sequence.

In this embodiment of the present application, storage files Hfile numbered from 1 to 7 represent different storage files, and this is merely intended to clearly describe the technical solutions in the embodiments of the present application. In this embodiment of the present application, storage files are distinguished according to metadata block content in the storage files.

It should be further understood that in this embodiment of the present application, the storage file combination procedure is performed when the quantity of storage files in the first storage medium meets the preset threshold, and this is merely intended to describe the technical solutions in the embodiments of the present application in detail. In this embodiment of the present application, a condition of triggering combination of storage files in a first storage may alternatively be another condition, and no limitation is set in this embodiment of the present application.

The data backup method according to the embodiments of the present application is described above in detail with reference to FIG. 1 to FIG. 3. A data processing system according to the embodiments of the present application is described below in detail with reference to FIG. 4 to FIG. 6.

Figure 4:
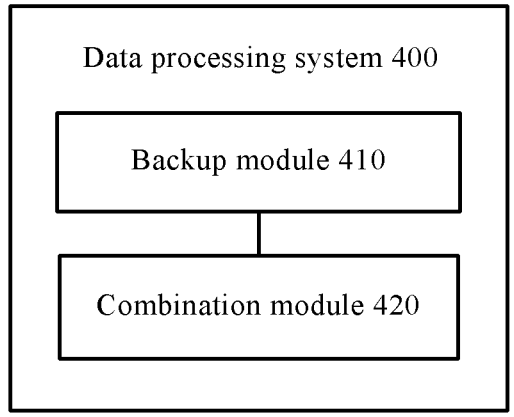
FIG. 4 is a schematic diagram of a data processing system according to an embodiment of the present application.

FIG. 4 is a schematic block diagram of a data processing system according to an embodiment of the present application. The data processing system 400 shown in FIG. 4 includes a backup module 410 and a combination module 420.

The backup module 410 is configured to: back up a first storage file, and record a first time point of the backup operation, where the first storage file is multiple storage files stored in a first storage medium before the first time point.

The combination module 420 is configured to: when a quantity of second storage files in the first storage medium meets a preset threshold, combine, according to the first time point, the second storage files to obtain at least two third storage files.

The backup module 410 is further configured to perform incremental backup on the at least two third storage files according to the first time point, where the incremental backup is backing up at least one third storage file generated after the first time point.

Specifically, the first storage medium may be specifically a magnetic disk. The first storage file may be all or some of storage files on magnetic disks of one or more terminals. The backup module 410 backs up all or some of the storage files on the magnetic disks at the first time point, and records the current file backup time point.

Optionally, in this embodiment of the present application, the backup module 410 may back up the first storage file according to a preset rule. The preset rule may be a data backup condition formulated according to a user requirement. Data backup is performed by using a preset rule, so as to facilitate use for a user, and ensure data reliability.

It should be understood that in this embodiment of the present application, backup of the first storage file may be artificially performed.

The second storage files are storage files stored in the first storage medium at a current time point, and the second storage files include the first storage file that has been backed up and a new storage file generated from the first time point to the current time point. The third storage file is a new storage file generated after combining the second storage files. When a quantity of storage files on the magnetic disk reaches a preset quantity threshold, the combination module 420 separately combines storage files generated before the first time point and storage files generated after the first time point into at least one storage file according to the first time point.

The backup module 410 performs incremental backup on the storage files generated after the first time point, reads timestamp ranges of all storage files, queries the storage files generated after the first time point, and performs incremental backup on data in the storage files according to a query result.

According to the data backup method in a distributed database provided in this embodiment of the present application, a file on which incremental backup is to be performed is determined by recording a previous backup time point to perform incremental backup, so as to avoid a process in which data in an entire table is read for backup of incremental data, thereby shortening a time of backing up the incremental data, and reducing consumption of network and magnetic disk resources for backing up the incremental data.

Figure 5:
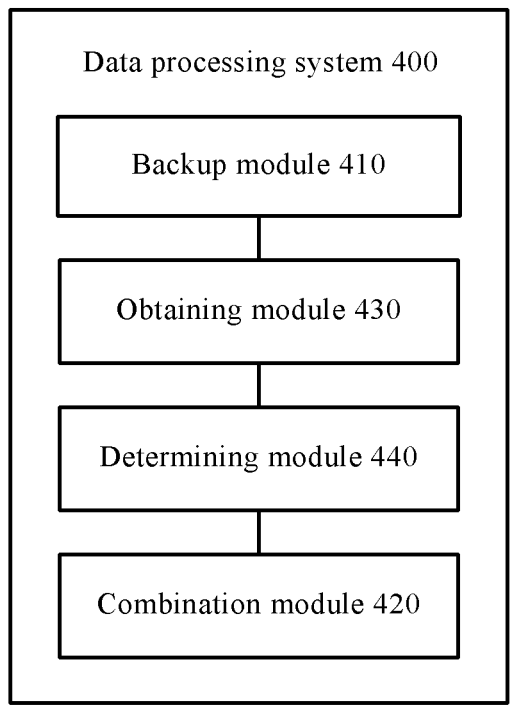
FIG. 5 is a schematic diagram of another data processing system according to an embodiment of the present application.

Preferably, in another embodiment of the present application, as shown in FIG. 5, the data processing system further includes an obtaining module 430 and a determining module 440.

The obtaining module 430 is configured to obtain timestamp ranges of the at least two third storage files.

The determining module 440 is configured to determine, according to the timestamp ranges of the at least two third storage files and the first time point, the at least one third storage file on which incremental backup is to be performed.

The backup module 410 is configured to back up the at least one third storage file.

Specifically, the obtaining module 430 reads timestamp ranges of all combined storage files, the determining module 440 determines, according to a timestamp range of each storage file, the third storage file whose timestamp range is after the first time point, and the backup module 410 backs up the determined third storage file generated after the first time point.

Optionally, in this embodiment of the present application, the obtaining module 430 may obtain a timestamp range from a metadata block of each third storage file.

In this embodiment of the present application, the backup module 410 is further configured to record a second time point of the incremental backup operation, so as to combine or back up newly generated storage files according to the second time point.

Specifically, after performing incremental backup on data, the backup module 410 records a time point of the current incremental backup operation, so that within a time period after the time point, when the quantity of storage files on the magnetic disk reaches the preset threshold, the combination module 420 combines the storage files according to the recorded time point, and the backup module 410 performs incremental backup on a combined storage file generated after the time point.

According to the data backup method in a distributed database provided in this embodiment of the present application, a file on which incremental backup is to be performed is determined by recording a previous backup time point to perform incremental backup, so as to avoid a process in which data in an entire table is read for backup of incremental data, thereby shortening a time of backing up the incremental data, and reducing consumption of network and magnetic disk resources for backing up the incremental data.

It should be noted that in this embodiment of the present application, the data processing system according to this embodiment of the present application is corresponding to an execution body of the method 100 according to the embodiments of the present application, and the foregoing and other operations and/or functions of the modules in the data processing system are respectively used to implement corresponding procedures of the methods in FIG. 2 and FIG. 3. For brevity, details are not described herein again.

Figure 6:
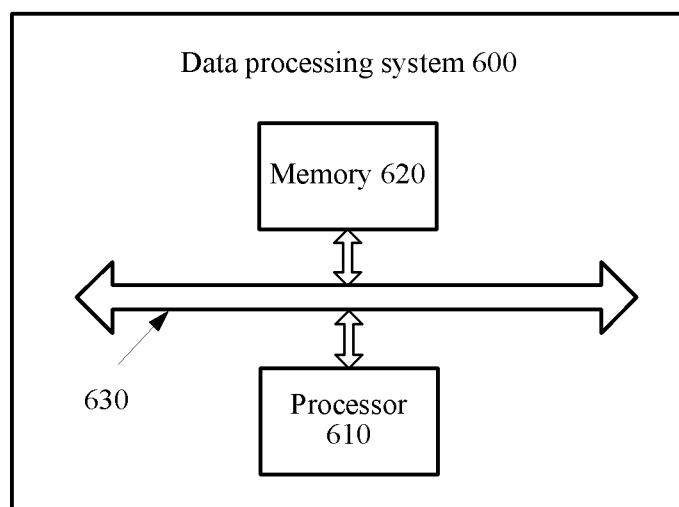
FIG. 6 is a schematic diagram of still another data processing system according to an embodiment of the present application.

FIG. 6 is a schematic diagram of still another data processing system according to an embodiment of the present application. As shown in FIG. 6, the data processing system 600 includes a processor 610, a memory 620, and a communications bus system 630. The processor 610 and the memory 620 are connected by using the communications bus system 630.

The processor 610 is configured to: back up a first storage file, and record a first time point of the backup operation, where the first storage file is multiple storage files stored in a first storage medium before the first time point.

The processor 610 is configured to: when a quantity of second storage files in the first storage medium meets a preset threshold, combine, according to the first time point, the second storage files to obtain at least two third storage files.

The processor 610 is further configured to perform incremental backup on the at least two third storage files according to the first time point, where the incremental backup is backing up at least one third storage file generated after the first time point.

Specifically, the first storage medium may be specifically a magnetic disk. The first storage file may be all or some of storage files on magnetic disks of one or more terminals. The processor 610 backs up all or some of the storage files on the magnetic disks at the first time point, and records the current file backup time point.

In this embodiment of the present application, the processor 610 may back up the first storage file according to a preset rule. The preset rule may be a data backup condition formulated according to a user requirement. In this embodiment of the present application, the processor 610 may back up the first storage file according to an instruction delivered by a user when the user needs to subjectively execute data backup.

The second storage files are storage files stored in the first storage medium at a current time point, and the second storage files may include the first storage file that has been backed up and a new storage file generated from the first time point to the current time point. The third storage file is a new storage file generated after combining the second storage files. When a quantity of storage files on the magnetic disk reaches a preset quantity threshold, the processor 610 separately combines storage files generated before the first time point and storage files generated after the first time point into at least one storage file according to the first time point.

The processor 610 performs incremental backup on the storage files generated after the first time point, reads timestamp ranges of all storage files, queries the storage files generated after the first time point, and performs incremental backup on data in the storage files according to a query result.

According to the data backup method in a distributed database provided in this embodiment of the present application, a file on which incremental backup is to be performed is determined by recording a previous backup time point to perform incremental backup, so as to avoid a process in which data in an entire table is read for backup of incremental data, thereby shortening a time of backing up the incremental data, and reducing consumption of network and magnetic disk resources for backing up the incremental data.

It should be understood that in this embodiment of the present application, the processor 610 may be a central processing unit (CPU), or the processor 610 may be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor, or the processor may be any conventional processor, or the like.

In addition to a data bus, the bus system 630 may include a power bus, a control bus, a status signal bus, and the like. However, for clarity of description, various buses are marked as the bus system 630 in the figure.

In an implementation process, the steps of the foregoing methods may be completed by an integrated logical circuit of hardware in the processor 610 or an instruction in a form of software. The steps of the methods disclosed with reference to the embodiments of the present application may be directly performed and completed by a hardware processor, or may be performed and completed by using a combination of hardware and software modules in the processor. The software module may be located in a mature storage medium in the field such as a random access memory, a flash memory, a read-only memory, a programmable read-only memory, an electrically-erasable programmable memory, or a register. The storage medium is located in the memory. The processor 610 reads information in the memory and completes the steps of the foregoing methods in combination with hardware of the processor. To avoid repetition, details are not described herein.

The memory may include a read-only memory and a random access memory, and provide an instruction and data for the processor 610. A part of the memory may further include a non-volatile random access memory. For example, the memory may further store information about a device type.

The processor 610 is configured to obtain timestamp ranges of the at least two third storage files.

The processor 610 is configured to determine, according to the timestamp ranges of the at least two third storage files and the first time point, the at least one third storage file on which incremental backup is to be performed.

The processor 610 is configured to back up the at least one third storage file.

Specifically, the processor 610 reads timestamp ranges of all combined storage files, the processor 610 determines, according to a timestamp range in a metadata block of each storage file, the third storage file whose timestamp range is after the first time point, and the processor 610 backs up the determined third storage file generated after the first time point.

It should be noted that in this embodiment of the present application, the data processing system 600 according to this embodiment of the present application is corresponding to the data processing system 400 according to the embodiments of the present application, and the foregoing and other operations and/or functions of the modules in the data processing system 600 are respectively used to implement corresponding procedures of the methods in FIG. 2 and FIG. 3. For brevity, details are not described herein.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present application are further described in detail. It should be understood that the foregoing descriptions are merely specific implementations of the present application, but are not intended to limit the protection scope of the present application. Any modification, equivalent replacement, or improvement made without departing from the spirit and principle of the present application should fall within the protection scope of the present application.

What is claimed is:

1. A data backup method performed in a distributed database, comprising:

backing up, by a terminal, first files stored on a storage medium to a nonvolatile backup storage device, and recording, by the terminal, a first backup time point associated with the backing up of the first files, the first files being stored on the storage medium before the first backup time point;

storing, by the terminal on the storage medium, second files generated after the first backup time point;

counting, by the terminal, a total number of files on the storage medium;

in response to the total number of files on the storage medium reaching a preset threshold, combining, by the terminal, the first files into a first combined file, and combining, by the terminal, the second files into a second combined file that is separate from the first combined file, wherein all files combined into the first combined file were stored on the storage medium before the first backup time point, and all files combined into the first combined file and combined into the second combined file are counted in the total number of files on the storage medium;

after combining the first files into the first combined file and combining the second files into the second combined file, comparing, by the terminal, a timestamp range of the first combined file with a timestamp range of the second combined file to determine that the second combined file corresponds to the second files generated after the first backup time point;

backing up by the terminal, the second combined file to the nonvolatile backup storage device; and storing, by the terminal, the first combined file on the storage medium.

2. The method according to claim 1, further comprising: recording a second time point associated with the backing up of the second combined file.

3. The method according to claim 1, further comprising: obtaining the timestamp range of the second combined file from a metadata block of the second combined file.

4. The method according to claim 1, further comprising: storing the second combined file on the storage medium.

5. A data processing system comprising:

a processor; and a non-transitory memory connected to the processor and storing executable instructions, wherein the processor is configured to execute the executable instructions stored in the non-transitory memory to:

back up first files stored on a storage medium to a nonvolatile backup storage device;

record a first backup time point associated with the backing up of the first files, the first files being stored on the storage medium before the first backup time point;

store, on the storage medium, second files generated after the first backup time point;

count a total number of files on the storage medium;

in response to the total number of files on the storage medium reaching a preset threshold, combine the first files into a first combined file, and combine the second files into a second combined file that is separate from the first combined file, wherein all files combined into the first combined file were stored on the storage medium before the first backup time point, and all files combined into the first combined file and combined into the second combined file are counted in the total number of files on the storage medium;

after combining the first files into the first combined file and combining the second files into the second combined file, compare a timestamp range of the first combined file with a timestamp range of the second combined file to determine that the second combined file corresponds to the second files generated after the first backup time point;

back up the second combined file to the nonvolatile backup storage device; and store the second combined file on the storage medium.

6. The system according to claim 5, wherein the processor is further configured to:

record a second time point associated with the backing up of the second combined file.

7. The system according to claim 5, wherein the processor is further configured to:

obtain the timestamp range of the second combined file from a metadata block of the second combined file.

8. The system according to claim 5, wherein the processor is further configured to:

store the first combined file on the storage medium.

9. A computer program product, comprising a non-transitory computer-readable medium storing computer executable instructions that, when executed by one or more processors, cause the one or more processors to perform operations of:

backing up first files stored on a storage medium to a nonvolatile backup storage device, and recording a first backup time point associated with the backing up of the first files, the first files being stored on the storage medium before the first backup time point;

storing, on the storage medium, second files generated after the first backup time point;

counting a total number of files on the storage medium;

in response to a total number of files on the storage medium reaching a preset threshold, combining the first files into a first combined file, and combining the second files into a second combined file that is separate from the first combined file, wherein all files combined into the first combined file were stored on the storage medium before the first backup time point, and all files combined into the first combined file and combined into the second combined file are counted in the total number of files on the storage medium;

comparing a timestamp range of the first combined file with a timestamp range of the second combined file to determine that the second combined file corresponds to the second files generated after the first backup time point;

backing up the second combined file to the nonvolatile backup storage device; and storing the first combined file on the storage medium, and storing the second combined file on the storage medium.

10. The computer program product according to claim 9, wherein the operations further comprise:

recording a second time point associated with the backing up of the second combined file.

11. The computer program product according to claim 9, wherein the operations comprise:

obtaining the timestamp range of the second combined file from a metadata block of the second combined file.

* * * * *